United States Patent [19]

Sato

[11] Patent Number: 5,940,061
[45] Date of Patent: Aug. 17, 1999

[54] LIQUID-CRYSTAL DISPLAY

[75] Inventor: Masayori Sato, Saitama-ken, Japan

[73] Assignee: Kabushiki Kaisha Toshiba, Kawasaki, Japan

[21] Appl. No.: 08/717,019

[22] Filed: Sep. 20, 1996

[30] Foreign Application Priority Data

Sep. 22, 1995  [JP]  Japan .................................. 7-244915

[51] Int. Cl.⁶ ...................................................... G09G 3/36
[52] U.S. Cl. .................................................. 345/99; 345/213
[58] Field of Search ................................ 345/98, 99, 100, 345/87, 127, 128, 129, 130, 131, 132, 212, 213

[56] References Cited

U.S. PATENT DOCUMENTS

| 5,406,308 | 4/1995 | Shiki ........................................ 345/99 |
| 5,534,940 | 7/1996 | Sato et al. . | |

FOREIGN PATENT DOCUMENTS

| 0 479 508 | 4/1992 | European Pat. Off. . |
| 567 301 | 10/1993 | European Pat. Off. . |
| 0 609 843 | 8/1994 | European Pat. Off. . |
| 6-59643 | 3/1994 | Japan . |

OTHER PUBLICATIONS

Tozaki Shozo, "Liquid Crystal Panel Drive and Control Circuit", Patent Abstracts of Japan, vol. 17, No. 287, Jan. 22, 1993.

Ko Hidemasa, et al. "Liquid Crystal Display Device", Patent Abstracts of Japan, vol. 17, No. 161, Nov. 13, 1992.

*Primary Examiner*—Xiao Wu
*Attorney, Agent, or Firm*—Pillsbury Madison & Sutro LLP

[57] ABSTRACT

A clock sent from a clock generator is subjected to frequency division by a plurality of frequency dividers responsible for different fractions of an input frequency. A switch selects and outputs any of the outputs of the plurality of frequency dividers, and thus varies the frequency of the clock within one horizontal scanning period. The clock is used to sample a video signal, whereby an image to be displayed on a liquid-crystal panel can be compressed or stretched according to a position in the horizontal direction of a screen. Thus, it can be prevented to give a sense of incompatibility even when a video signal indicating an aspect ratio different from the aspect ratio of the screen is displayed.

12 Claims, 6 Drawing Sheets

LIQUID-CRYSTAL DISPLAY

BACKGROUND OF THE INVENTION

1. Field of the Invention

The present invention relates to a liquid-crystal display, or more particularly, to a liquid-crystal display capable of not giving a sense of incompatibility to viewers at the time of displaying a video signal indicating an aspect ratio different from the size of a screen of a liquid-crystal panel.

2. Description of the Related Art

In recent years, a television set using an image receiving tube has been used as an information transmission means in the advanced information age. A liquid-crystal television set using a liquid-crystal module is attracting attention in past years. In particular, a liquid-crystal projector using a liquid crystal is under earnest research and development. In the field of broadcast systems, the research and development of a Hi-Vision system or EDTV-2 system (aspect ratio of 16:9) is under way in parallel with that of a conventional NTSC system (aspect ratio of 4:3). Experimental broadcasting based on the Hi-Vision system has been started. Accordingly, a device having an aspect ratio of 16:9 has been developed as a liquid-crystal module. Besides, products offering the aspect ratio of 16:9 have made their debuts.

FIG. 5 is a block diagram showing a related art of such a liquid-crystal display.

In FIG. 5, a video signal a5, horizontal synchronizing (hereinafter sync) signal b5, and vertical sync signal c5 sent from a video signal processing circuit that is not shown are introduced into input terminals 81, 82, and 83.

The video signal a5 introduced into the input terminal 81 is supplied to a sample and hold circuit 92. The horizontal sync signal b5 introduced into the input terminal 82 is supplied to a clock generator 86 of a clock oscillator circuit 85. The vertical sync signal c5 introduced into the input terminal 83 is supplied to a clock circuit 87 for a vertical-direction shift register (hereinafter referred to as a V clock circuit 87) of the clock oscillator circuit 85.

The clock oscillator circuit 85 comprises the clock generator 86, V clock circuit 87, a voltage-controlled oscillator (VCO) 88, and a clock circuit 89 for a horizontal-direction shift register (hereinafter referred to as an H clock circuit 89).

The VCO 88 has an oscillatory frequency thereof set to a frequency dependent on the number of pixels in a liquid-crystal panel 95, and supplies an oscillatory signal thereof to the clock generator 86. The clock generator 86 outputs the oscillatory signal sent from the VCO 88 synchronously with the horizontal sync signal b5 supplied through the input terminal 82, and supplies a clock d5 to the H clock circuit 89.

The H clock circuit 89 obtains a fraction of 1/n (n denotes a natural number) of the frequency of the clock d5, produces a clock e5, and supplies the clock e5 to a clock terminal of a horizontal-direction shift register (hereinafter referred to as an H shift register) 84 and to the V clock circuit 87. The V clock circuit 87 obtains a fraction of 1/m (m denotes a natural number) of the frequency of the clock e5, outputs an output resulting from frequency division synchronously with the vertical sync signal c5 supplied through the input terminal 83, and thus supplies a clock f5 to the clock terminal of the V shift register 91.

The H shift register 84, sample and hold circuit 92, and an X driver 93 are designed to have the number of bits agreeing with the number of pixels in the horizontal direction of the liquid-crystal panel 95. The H shift register 84 shifts the clock e5 continuously, and outputs a resultant pulse as a sample pulse successively through the bits associated with the pixels in the horizontal direction. The video signal a5 is supplied to the sample and hold circuit 92 through the terminal 81. According to the timing of the sample pulse to be input in relation to each pixel, pulses of a video signal associated with the pixels in the horizontal direction are sampled and held. When the video signals representing one line have been held in the sample and hold circuit 92, the X driver 93 applies the held video signals representing one line to data lines (not shown) in the liquid-crystal panel 95.

The V shift register 91 and a Y driver 94 have the number of bits agreeing with the number of pixels in the vertical direction of the liquid-crystal panel 95. The V shift register 91 shifts the input clock f5 continuously, and outputs a resultant pulse to the Y driver 94 successively through the bits associated with the pixels in the vertical direction. The Y driver 94 applies the output of the V shift register 91 as a scan signal to scan lines in the liquid-crystal panel 95.

In the liquid-crystal panel 95, a liquid-crystal pixel is formed between each pair of data lines and scan lines which are arranged in the form of a matrix. Video signal data is written in liquid-crystal pixels selected by the X driver 93 and Y driver 94, whereby the transmittance of the liquid crystal is controlled. Located on the back side of the liquid-crystal panel 95 is a light source (not shown). Light emanating from the light source is transmitted by the liquid-crystal panel 95 and thus converted into picture light. In the case of this kind of projection type liquid-crystal display, light transmitted by a liquid-crystal panel is enlarged and projected on a screen by a projection lens.

By the way, when the aspect ratio of the liquid-crystal panel 95 is the same as the one indicated by a video signal to be displayed on the panel, a display picture appears properly. However, if the aspect ratio of the liquid-crystal panel 95 is different from the one indicated by a video signal, a problem occurs. This will be described in conjunction with FIG. 6.

In FIG. 6, reference numeral 101 denotes a video signal indicating an aspect ratio of 4:3. When this kind of video signal is displayed on the liquid-crystal panel 95 having an aspect ratio of 16:9 as it is, the video signal appears as a picture 102 stretching sideways and gives a sense of incompatibility to viewers.

For resolving this kind of sideways stretch phenomenon, for example, as shown in FIG. 7, a video signal indicating the aspect ratio of 4:3 is stretched uniformly in the vertical and lateral directions, and then displayed in the liquid-crystal panel 95 having the aspect ratio of 16:9. Consequently, the video signal is displayed as a picture 103 with a correct roundness. However, in this case, there is a drawback that video information coincident with the top and bottom of a screen is lost.

As shown in FIG. 8, it is also conceivable that completely different pictures (for example, black pictures 105 and 106) are appended to the right-hand and left-hand sides of a picture represented by a video signal indicating the aspect ratio of 4:3 so that a picture 104 having a correct roundness can be displayed. In this case, however, pictures unrelated to an original picture are displayed to give a sense of incompatibility to viewers. Besides, a wide liquid-crystal panel cannot be utilized effectively.

In other words, when the aspect ratio of a liquid-crystal panel is different from the one indicated by a video signal to be displayed on the panel, a picture may be distorted, information coincident with upper and lower parts of a screen may be lost, or measures must be taken by displaying unrelated pictures. Consequently, a sense of incompatibility is given to viewers.

OBJECT AND SUMMARY OF THE INVENTION

An object of the present invention is to provide a liquid-crystal display capable of displaying a picture not giving a sense of incompatibility even when the aspect ratio of a liquid-crystal panel is different from the one indicated by a video signal.

A liquid-crystal display of the present invention comprises: a liquid-crystal panel including a plurality of liquid-crystal pixels formed like a matrix with a plurality of data lines arranged in the vertical direction and a plurality of scan lines arranged in the horizontal direction, and having the liquid-crystal pixels driven with picture data applied to the data lines and a scan signal applied to the scan lines; a clock generating means including a means for producing a first clock synchronous with a horizontal sync signal conveyed with an input video signal, and being able to vary the frequency of the first clock within one horizontal scanning period, and a means for producing a second clock synchronous with a vertical sync signal conveyed with the input video signal and being able to vary the frequency of the second clock within one vertical scanning period, and being able to vary at least one of the frequencies of the first and second clocks within a given period; a scanning means for producing a scan signal to be supplied to the scan lines in the liquid-crystal panel using the second clock, and scanning the liquid-crystal panel with the produced scan signal; and a picture data supplying means for sampling and holding the input video signal using the first clock, and supplying the sampled and held signal as picture data to the data lines in the liquid-crystal panel.

Other features and advantages of the present invention will be fully apparent from the description below.

DESCRIPTION OF THE PREFERRED EMBODIMENTS

Figure 1:
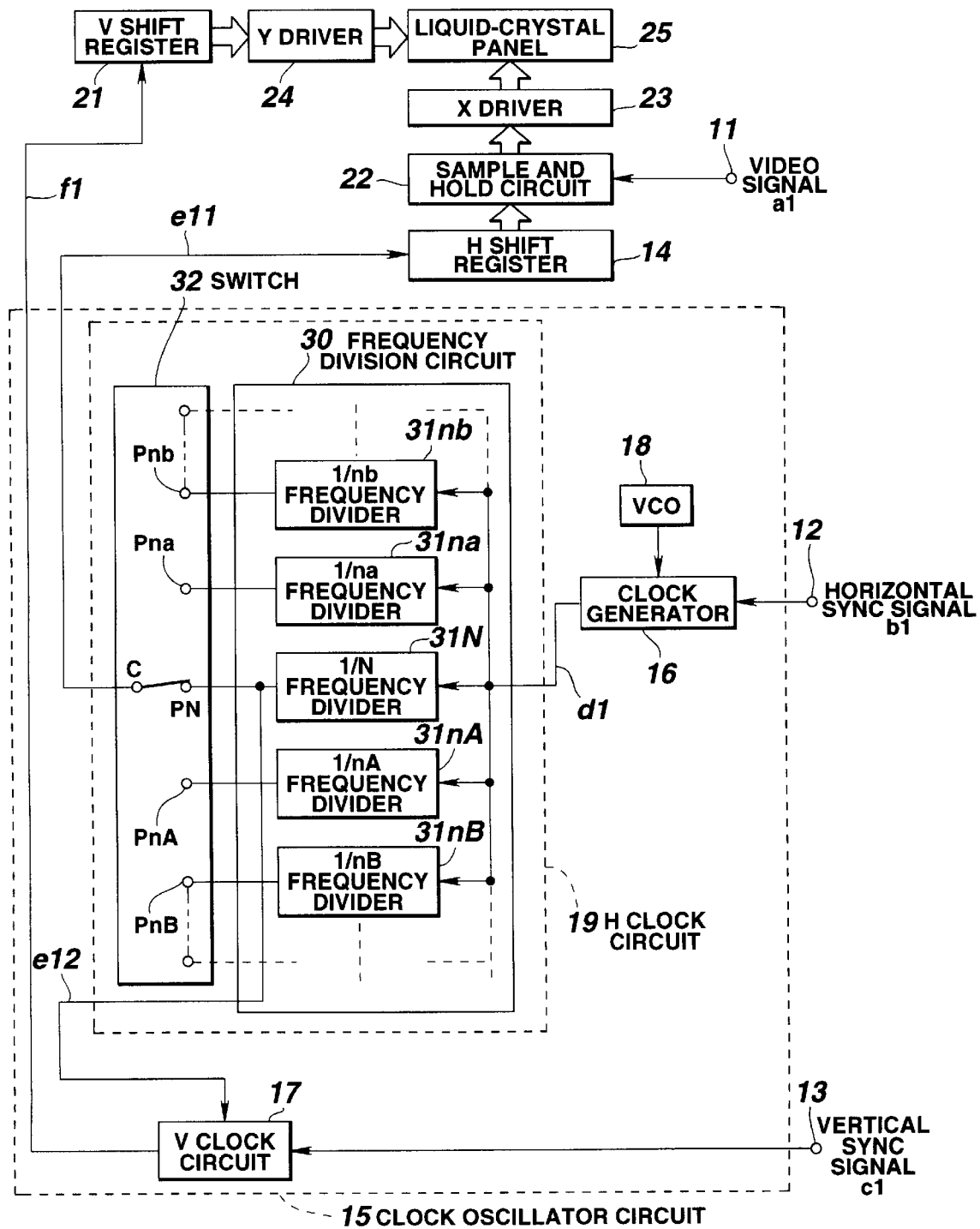
FIG. 1 is a block diagram showing the first embodiment of a liquid-crystal display in accordance with the present invention.

Referring to the appended drawings, embodiments of the present invention will be explained in detail. FIG. 1 is a block diagram showing the first embodiment of a liquid-crystal display in accordance with the present invention.

In general, more emphasis tends to be placed on part of an image appearing in the center of a television screen than the other part thereof appearing at the right-hand or left-hand edge thereof. A distortion appearing at the right-hand or left-hand edge of the screen is less conspicuous than that appearing in the center thereof. This embodiment makes the most of this feature, and attempts to improve display definition by stretching or compressing an image in the horizontal direction at a ratio dependent on a horizontal position in a screen, and thus displaying substantially the whole of the image over substantially the whole of the screen. In this embodiment, a sample clock frequency is varied within one horizontal scanning period, thus enabling stretch or compression of an image.

In FIG. 1, a video signal a1 sent from a video signal processing circuit that is not shown, a horizontal sync signal b1, and a vertical sync signal c1 are introduced into input terminals 11, 12, and 13. The video signal a1 input through the input terminal 11 is supplied to a sample and hold circuit 22. The horizontal sync signal b1 input through the input terminal 12 is supplied to a clock generator 16 of a clock oscillator circuit 15. The vertical sync signal c1 input through the input terminal 13 is supplied to a V clock circuit 17 of the clock oscillator circuit 15.

A liquid-crystal panel 25 has a plurality of liquid-crystal pixels formed like a matrix at interceptions between a plurality of data lines arranged in the vertical direction and a plurality of scan lines arranged in the horizontal direction. With the application of a scan signal from a Y driver 24 that will be described later, the scan lines successively become active in the order in which they are scanned. A video signal is supplied from an X driver 23 that will be described later to each data line. Liquid-crystal pixels at locations constituting an activated scan line are driven with video signals applied to the respective data lines. In other words, the transmittance of a liquid crystal on an active line is controlled with video signals applied to the respective data lines.

A light source (not shown) is located on the back side of the liquid-crystal panel 25. Light emanating from the light source is transmitted by the liquid crystal and thus converted into picture light. In the case of a projection type liquid-crystal display, light transmitted by a liquid-crystal panel is enlarged and projected on a screen by a projection lens.

The clock oscillator circuit 15 comprises the clock generator 16, the V clock circuit 17, a VCO 18, and an H clock circuit 19. The VCO 18 has an oscillatory frequency thereof set to a frequency dependent on the number of pixels in the horizontal direction. Assuming that the number of pixels in the horizontal direction of the liquid-crystal panel 25 is k and one horizontal scanning period is H, for example, the frequency of the VCO 18 is set to a value given by N*k/H (N denotes a natural number).

An oscillatory signal sent from the clock oscillator circuit 15 is supplied to the clock generator 16. The clock generator 16 synchronizes the oscillatory signal sent from the VCO 18 with the horizontal sync signal b1 supplied through the input terminal 12, and supplies a resultant signal as a clock d1 to the H clock circuit 19.

Next, the H clock circuit 19 that is a pivotal component of this embodiment will be described.

The H clock circuit 19 consists of a frequency division circuit 30 and a selection switch 32. The frequency division circuit 30 is composed of a plurality of frequency dividers responsible for different fractions of an input frequency, that is, a 1/N frequency divider 31N, 1/na frequency divider 31na, 1/nb frequency divider 31nb, etc., 1/nA frequency divider 31nA, 1/nB frequency divider 31nB, etc.

The 1/N frequency divider 31N is a reference frequency divider of the frequency division circuit 30, obtains a fraction of 1/N of the frequency of the supplied clock d1, and supplies a resultant voltage to an input terminal PN of the selection switch 32. When the oscillatory frequency of the VCO 18 is N*k/H, the clock sent from the 1/N frequency divider 31N has a frequency of k/H. The number of clock pulses generated during one horizontal scanning period is therefore k. The 1/N frequency divider 31N corresponds to the H clock circuit 89 in the conventional display.

Assuming that the number of pixels in the horizontal direction of the liquid-crystal panel 25 is k=800, one horizontal scanning period is 50 microseconds, and N equals to 4, the oscillatory frequency of the VC0 18 is set to 4*800/50 microseconds=64 MHz. In this case, the clock output from the 1/N frequency divider 31N has a frequency of 16 MHz. The number of clock pulses output within one horizontal scanning period is therefore 800.

By contrast, the 1/na frequency divider 31na, 1/nb frequency divider 31nb, etc., 1/nA frequency divider 31nA, 1/nB frequency divider 31nB. etc. obtain fractions of 1/na, 1/nb, etc., 1/nA, 1/nB. etc. of the frequency of the supplied clock d1, and supply resultant voltages to input terminals Pna, Pnb, etc., PnA, PnB, etc. of the selection switch 32. The fractions of an input frequency have the relationships of 1/nb<1/na<1/N<1/nA<1/nB, etc.

The switch 32 is reset with a start pulse, which is not shown, synchronous with the horizontal sync signal b1. Based on data keyed in by a user, the switch 32 changes and selects the input terminals PN, Pna, Pnb, etc. PnA, PnB, etc. within one horizontal scanning period, and supplies the received output of the frequency division circuit 30 to an H shift register 14.

The switching of the switch 32 is controlled by a control means that is not shown, such as, a microprocessor. In this embodiment, the switch 32 is designed to agree the number of clock pulses, which are output from the frequency dividers of the frequency division circuit 30 within one horizontal scanning period, for example, with k (the number of pixels in the horizontal direction), and to select a frequency divider output having a frequency associated with a position in a screen of the liquid-crystal panel 25. For example, when an image having an aspect ratio of 4:3 is rendered on a liquid-crystal panel having an aspect ratio of 16:9, the switch 32 selects an output of a frequency divider responsible for a relatively large fraction according to the timing coincident with the timing of part of an image to be displayed in the center of a screen, and selects an output of a frequency divider responsible for a relatively small fraction according to the timing coincident with the timing of part of an image to be displayed at the right-hand or left-hand edge of the screen.

The H shift register 14, sample and hold circuit 22, and X driver 23 have the numbers of input ports and output ports agreeing with the number of pixels in the horizontal direction of the liquid-crystal panel 25 (number of data lines). The H shift register 14 has the output ports thereof connected to the input ports of the sample and hold circuit 22, and shifts the output ports thereof, through which a sample pulse is output, successively with the input of a clock pulse of a clock e11 sent from the switch 32.

The video signal a1 is input to the sample and hold circuit 22 through the input terminal 11. The sample and hold circuit 22 has a plurality of holding elements, which are not shown, associated with the output ports thereof, samples a video signal according to the timing of a sample pulse input successively to the input ports thereof, and preserves resultant video signals in the holding elements associated with the output ports. When the switch 32 provides, for example, k clock pulses during one horizontal scanning period, the sample and hold circuit 22 holds video signals constituting one line within one horizontal scanning period.

The video signals sampled and held by the sample and hold circuit 22 are supplied to the X driver 23 through the output ports. The X driver 23 has the output ports thereof connected to the data lines in the liquid-crystal panel 25, and applies the video signals constituting one line to the respective data lines.

By the way, the clock e12 output from the 1/N frequency divider 31N is also supplied to the V clock circuit 17. The V clock circuit 17 obtains a fraction of 1/M of the frequency of the clock e12, and produces a clock f1 synchronous with the vertical sync signal c1 supplied through the terminal 13. The clock f1 has the same number of clock pulses as the number of scan lines generated during one vertical scanning period. The clock f1 is supplied to a clock terminal of the V shift register 21.

The V shift register 21 and Y driver 24 have the numbers of input ports and output ports agreeing with the number of pixels in the vertical direction of the liquid-crystal panel 25 (number of scan lines). The V shift register 21 has the output ports thereof connected to the input ports of the Y driver 24, shifts the output ports thereof, through which a scan pulse is output, successively with the input of one clock pulse of the clock f1 sent from the Y clock circuit 17.

The Y driver 24 has the output ports thereof connected to the scan lines, supplies a scan pulse successively to the scan lines, and activates the scan lines successively.

The V shift register 21 and Y driver 24 constitute a scanning means for the liquid-crystal panel 25. The H shift register 14, sample and hold circuit 22, and X driver 23 constitute a picture data supplying means for the liquid-crystal panel 25.

Next, the operations of the embodiment having the foregoing components will be described with reference to FIGS. 2A to 2I.

FIGS. 2A to 2C show clocks output from the 1/na frequency divider 31na, 1/N frequency divider 31N, and 1/nA frequency divider 31nA constituting the frequency division circuit 30. FIGS. 2A to 2C show examples in which the clock frequency of the 1/nA frequency divider 31nA is a double of that of the 1/N frequency divider 31N, the clock frequency of the 1/N frequency divider 31N is a double of that of the 1/na frequency divider 31na. Incidentally, for example, the clock frequency of the 1/nb frequency divider 31nb is a half of that of the 1/na frequency divider 31na, the clock frequency of the 1/nB frequency divider 31nB is a double of that of the 1/nA frequency divider 31nA. FIG. 2D shows the clock e11 output from the switch 32 through the output terminal C thereof. In the illustrated examples, the switch 32 selects the terminals Pna, PN, and PnA successively. FIG. 2E shows a video signal supplied through the input terminal 11. In this example, the video signal indicates brightness whose level gets higher stepwise in order of period; periods t1, t2, t3, and t4. Periods t1 to t4 constitute one horizontal scanning period. FIG. 2F shows application of sample data acquired at sampling time instants o to data lines. FIG. 2G shows application of sample data acquired at sampling time instants x to the data lines. FIG. 2H shows a display based on the sample data acquired at the sampling time instants o. FIG. 2I shows a display based on the sample data acquired at the sampling time instants x.

The video signal a1 is supplied to the sample and hold circuit 22 through the input terminal 11. The horizontal sync signal b1 is supplied to the clock generator 16 of the clock oscillator circuit 15 through the input terminal 12. The vertical sync signal c1 is supplied to the V clock circuit 17 of the clock oscillatory circuit 15 through the input terminal 13.

Assume that the number of pixels in the horizontal direction of the liquid-crystal panel 25 is k. The VCO 18 generates an oscillatory signal having a frequency of N*k/H. The oscillatory signal is synchronized with the horizontal sync signal by the clock generator 16, and fed to the frequency division circuit 30. The clock d1 is subjected to frequency division by the frequency dividers of the frequency division circuit 30.

Assume that the aspect ratio of the liquid-crystal panel 25 agrees with the one indicated by the video signal a1. In this case, the switch 32 selects the terminal PN and outputs the output of the 1/N frequency divider 31N. The 1/N frequency divider 31N obtains a fraction of 1/N of the frequency of the clock d1. A clock e11 having a frequency of k/H is output from the switch 32. The number of clock pulses of the clock e11 is k during one horizontal scanning period.

The clock e11 is supplied to the H shift register 14. A sample pulse is output successively from the k output ports of the H shift register 14. With k sample pulses generated during one horizontal scanning period, the video signal is sampled continuously. Resultant video signals constituting one line are held in the k holding elements of the sample and hold circuit 22 associated with the pixels in the horizontal direction of the liquid-crystal panel 25.

The video signals sampled and held by the sample and hold circuit 22 are supplied to the respective data lines in the liquid-crystal panel 25 via the X driver 23.

By the way, the clock e12 output from the 1/N frequency divider 31N is supplied to the V clock circuit 17 and converted into a clock having a fraction of 1/M of the frequency of the clock e12. The frequency of the clock f1 output from the V clock circuit 17 is N*k/M*H. The number of clock pulses of the clock f1 within one vertical scanning period agrees with the number of scan lines. The clock f1 is supplied to the V shift register 21. A scan pulse is output successively from the output ports of the V shift register 17. Scan pulses output from the output ports are supplied to the respective scan lines in the liquid-crystal panel 25 by the Y driver 24.

A scan line to which a scan pulse is applied becomes active. Based on a video signal applied to one data line orthogonal to the scan line, a liquid-crystal pixel formed by the scan line and data line is driven. Thus, liquid-crystal display is performed line by line. Every time a scan line to be activated is changed to another line, video signals constituting one line and being stored in the sample and hold circuit 22 are applied to the data lines. Consequently, display is performed on the whole screen of the liquid-crystal panel 25. In this case, since the aspect ratio of the liquid-crystal panel 25 agrees with the one indicated by a video signal, all picture lines are displayed over the whole screen of the liquid-crystal panel 25 without any distortion.

Next, the aspect ratio of the liquid-crystal panel 25 shall be different from the one indicated by a video signal input through the input terminal 11. FIG. 2E shows a variation of a video signal during a given horizontal scanning period. For brevity's sake, the number of pixels in the horizontal direction of the liquid-crystal panel 25, k, is 8. FIGS. 2A to 2I show sampling of a video signal in the horizontal direction under these situations. Each of periods t1 to t4 is a quarter of one horizontal scanning period.

Figure 8:
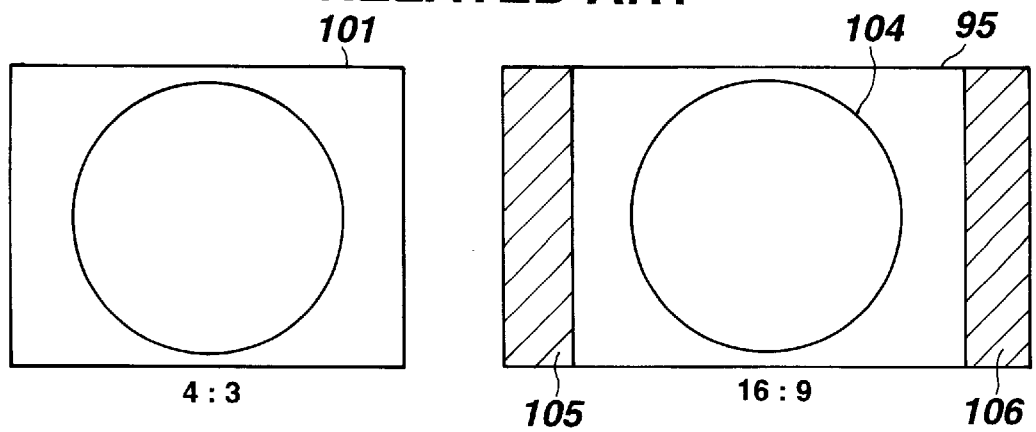
FIG. 8 is an explanatory diagram showing the third method of displaying a picture having an aspect ratio of 4:3 on a liquid-crystal panel whose screen has an aspect ratio of 16:9.

The number of clock pulses of a clock output from the 1/N frequency divider 31N is, as shown in FIG. 2B, 8 during one horizontal scanning period. When the clock (hereinafter also referred to as a horizontal reference clock) is used for sampling, sampling is performed at time instants indicated with o in FIG. 2E. Since the spacing in the horizontal direction of the data lines arranged in the liquid-crystal panel 25 is uniform, assuming that patterns to be displayed during periods t1, t2, t3, and t4 are a solid pattern, right obliquely hatched pattern, left obliquely hatched pattern, and crosshatched pattern, the display of one line based on the video signal shown in FIG. 2E is as shown in FIG. 2H.

In this embodiment, when a video signal indicating an aspect ratio different from the aspect ratio of the liquid-crystal panel 25 is input, the switch 32 selects a frequency divider associated with a position in the horizontal direction of a screen. For example, the switch 32 selects the 1/na frequency divider 31na during a period corresponding to periods t1 and t2, selects the 1/N frequency divider 31N during a period corresponding to period t3, and selects the 1/nA frequency divider 31nA during a period corresponding to period t4. In this case, the clock e11 output from the switch 32 becomes as shown in FIG. 2D.

The H shift register 14 generates a sample pulse at each leading edge of the clock e11. The sample and hold circuit 22 therefore samples a video signal at time instants x in FIG. 2E. In other words, since a clock whose frequency is a half of that of the horizontal reference clock is used during the period corresponding to periods t1 and t2, the number of sample pulses generated during the period corresponding to periods t1 and t2 is a half of that generated using the horizontal reference clock. The number of sample pulses generated during the period corresponding to period t4 is a double of that generated using the horizontal reference clock.

In other words, the video signal is sampled at two sampling time instants during periods t1 and t2 during which the video signal is supposed to be sampled at four sampling time instants. The resultant video signals are applied to two data lines. The spacing of data lines in the liquid-crystal panel 25 is constant. That is to say, as shown in FIGS. 2F and 2G, video signals sampled according to the timing of a sample pulse are applied to data lines having a constant horizontal spacing between them. Part of a picture to be displayed in a half area of the liquid-crystal panel 25 in the horizontal direction thereof (solid and right obliquely hatched patterns in FIG. 2H) is, as shown in FIG. 2I, displayed in a quarter area in the horizontal direction. In short, part of the picture coincident with this period is compressed half in the horizontal direction.

By contrast, during period t4, a video signal supposed to be sampled at two sampling time instants is sampled at four sampling time instants. The resultant video signals are then applied to four data lines. Part of a picture to be displayed in a quarter area of the liquid-crystal panel 25 in the horizontal direction thereof (a crosshatched pattern in FIG. 2H) is, as shown in FIG. 2I, displayed in a half area of the liquid crystal panel 25 in the horizontal direction thereof. In short, part of the video signal coincident with this period is stretched double in the horizontal direction.

Thus, since the switch 32 changes frequency dividers to be selected, a picture to be displayed on the liquid-crystal panel 25 can be compressed or stretched in the horizontal direction at a desired compression or stretch ratio. Moreover, since the switch 32 changes frequency dividers in the same manner during each horizontal scanning period, the compression or stretch ratio can be modified according to a position in the horizontal direction of a screen. For displaying all picture lines based on an input video signal over the whole of the liquid-crystal panel 25, the switch 32 must select frequency dividers so that the number of clock pulses of the clock e11 within one horizontal scanning period becomes k.

Assume that the liquid-crystal panel 25 has an aspect ratio of 16:9 and an input video signal indicates an aspect ratio of 4:3 (for example, an NTSC broadcast signal). In this case, when the horizontal reference clock alone is used, a picture stretching sideways shown in FIG. 6 ensues. In this embodiment, the selection by the switch 32 makes it possible to suppress the sideways stretch phenomenon. Specifically, part of a picture to be displayed on the liquid-crystal panel 25 appearing in the center in the horizontal direction of a screen is compressed, and the remaining part thereof is stretched stepwise toward the right-hand and left-hand edges of a screen. Consequently, the roundness in the center of the screen improves and a picture not giving a sense of incompatibility ensues. The switch 32 is therefore switched over to the 1/nB frequency divider 31nB, 1/nA frequency divider 31nA, etc., and 1/nb frequency divider 31nb in that order during a first half of one horizontal scanning period, and switched over to the 1/nb frequency divider 31nb, 1/na frequency divider 31na, etc., and 1/nB frequency divider 31nB in that order during a second half thereof.

In the foregoing case, parts of the picture appearing at the right-hand and left-hand edges are stretched a bit. However, since more emphasis generally tends to be put on part of a picture in the center of a television screen, the stretches of the right-hand and left-hand edges are rather indiscernible. Consequently, a picture not giving a sense of incompatibility can be displayed in a wide screen.

Moreover, when an aspect ratio indicated by an input video signal is larger than the aspect ratio of the liquid-crystal panel 25, part of a picture in the center of a screen is stretched, and the remaining part thereof is compressed stepwise toward the right-hand and left-hand edges of the screen. Thus, a picture not giving a sense of incompatibility can be displayed.

As mentioned above, compression or stretch can be performed arbitrarily in the horizontal direction according to an input video signal. Incidentally, when the number of clock pulses within one horizontal scanning period is not agreed with the number of pixels in the horizontal direction of the liquid-crystal panel 25 (the number of data lines), a missing image area or a non-image area occurs at both edges in the horizontal direction of a screen. Even in this case, an easy-to-see image may be produced depending on the size of an image display area, the size of the non-image area, the roundness of an image, or the like. The number of clock pulses within one horizontal scanning period, and compression or stretch ratios associated with positions in the horizontal direction of a screen should be able to be set freely.

Figure 3:
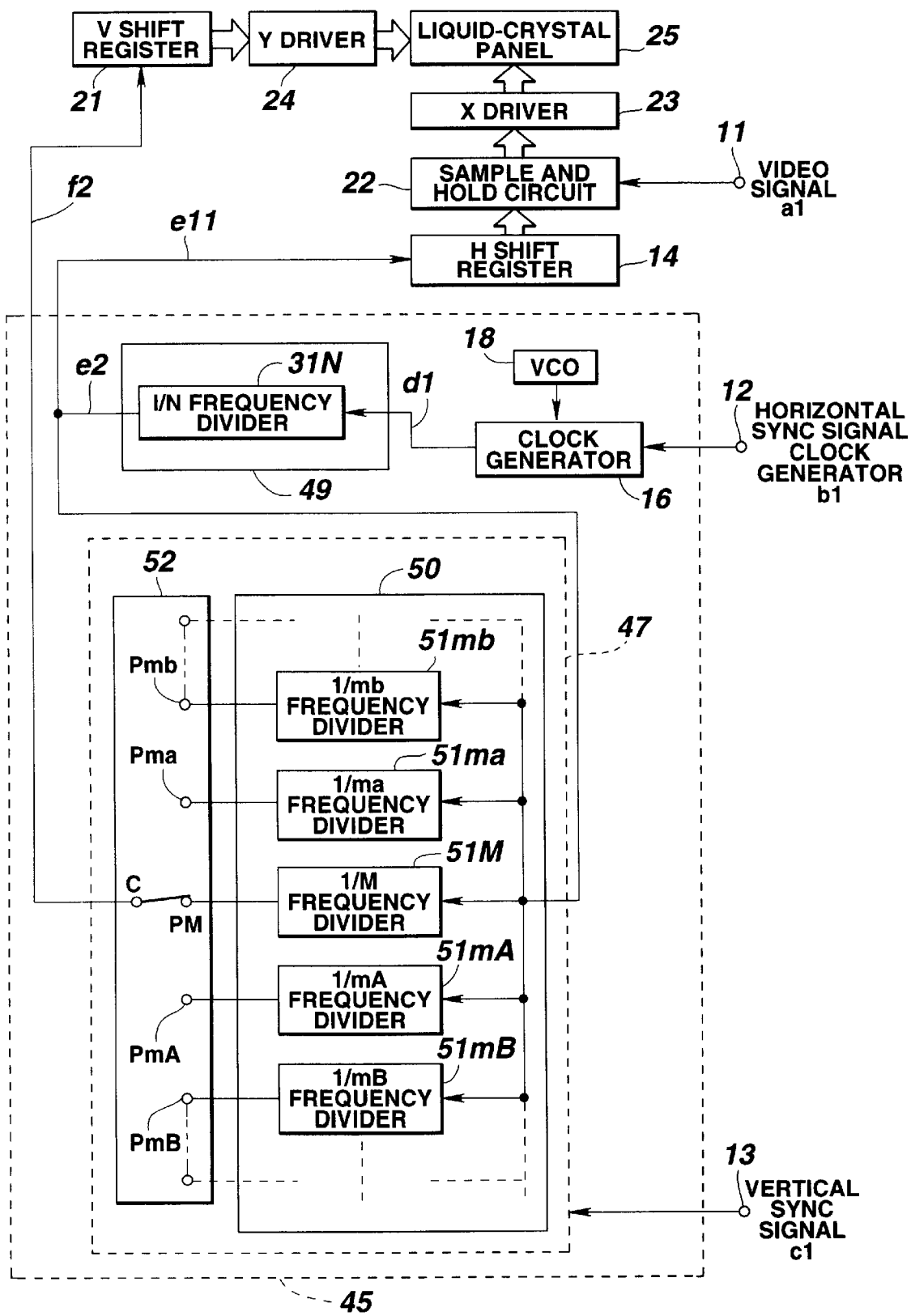
FIG. 3 is a block diagram showing the second embodiment of a liquid-crystal display in accordance with the present invention.

FIG. 3 shows the second embodiment of the present invention. In FIG. 3, components identical to those in FIG. 1 are assigned the same reference numerals. The description of the components will be omitted.

The embodiment in FIG. 3 enables compression or stretch in the vertical direction of a screen, and is different from the embodiment shown in FIG. 1 in a point that a clock oscillatory circuit 45 is adopted instead of the clock oscillatory circuit 15. The clock oscillatory circuit 45 comprises a VCO 18, clock generator 16, H clock circuit 49, and V clock circuit 47. The H clock circuit 49 includes a 1/N frequency divider 31N alone.

The 1/N frequency divider 31N obtains a fraction of 1/N of the frequency of a clock d1 sent from the clock generator 16 and supplies a clock e2 to an H shift register 14 and a frequency division circuit 50 in the V clock circuit 47.

The V clock circuit 47 comprises the frequency division circuit 50 having a plurality of frequency dividers and a selection switch 52. The frequency division circuit 50 is composed of a 1 M frequency divider 51M, 1/ma frequency divider 51ma, 1/mb frequency divider 51mb, etc., 1/mA frequency divider 51mA, 1/mB frequency divider 51mB, etc. which are responsible for different fractions of an input frequency.

The 1/M frequency divider 51M, which is a reference frequency divider of the frequency division circuit 50, obtains a fraction of 1/M of the frequency of a supplied clock e2 and supplies a resultant voltage as a vertical reference clock to an input terminal PM of the switch 52. The 1/ma frequency divider 51ma, 1/mb frequency divider 51mb, etc., 1/mA frequency divider 51mA, 1/mB frequency divider 51mB, etc. obtain fractions of 1/ma, 1/mb, etc., 1/mA, 1/mB, etc. of the frequency of the supplied clock e2, and supply resultant voltages to input terminals Pma, Pmb, etc., PmA, PmB, etc. of the switch 52. The fractions of an input frequency have the relationships of 1/mb<1/ma<1/M<1/mA<1/mB, etc.

The switch 52 is reset with a start pulse, which is not shown, synchronous with the vertical sync signal c1. Based on data keyed in by a user, the switch 52 selects the input terminals PM, Pma, Pmb, etc., PmA, PmB, etc. during one vertical scanning period, and supplies a received output of the frequency division circuit 50 to the V shift register 21. The switching of the switch 52 is controlled by a control means that is not shown such as a microprocessor. In this embodiment, the switch 52 agrees the number of clock pulses output from the frequency dividers of the frequency division circuit 50 with the number of scan lines during one vertical scanning period, and selects an output of a frequency divider whose clock frequency is associated with a position in a screen of the liquid-crystal panel 25.

Figure 2:
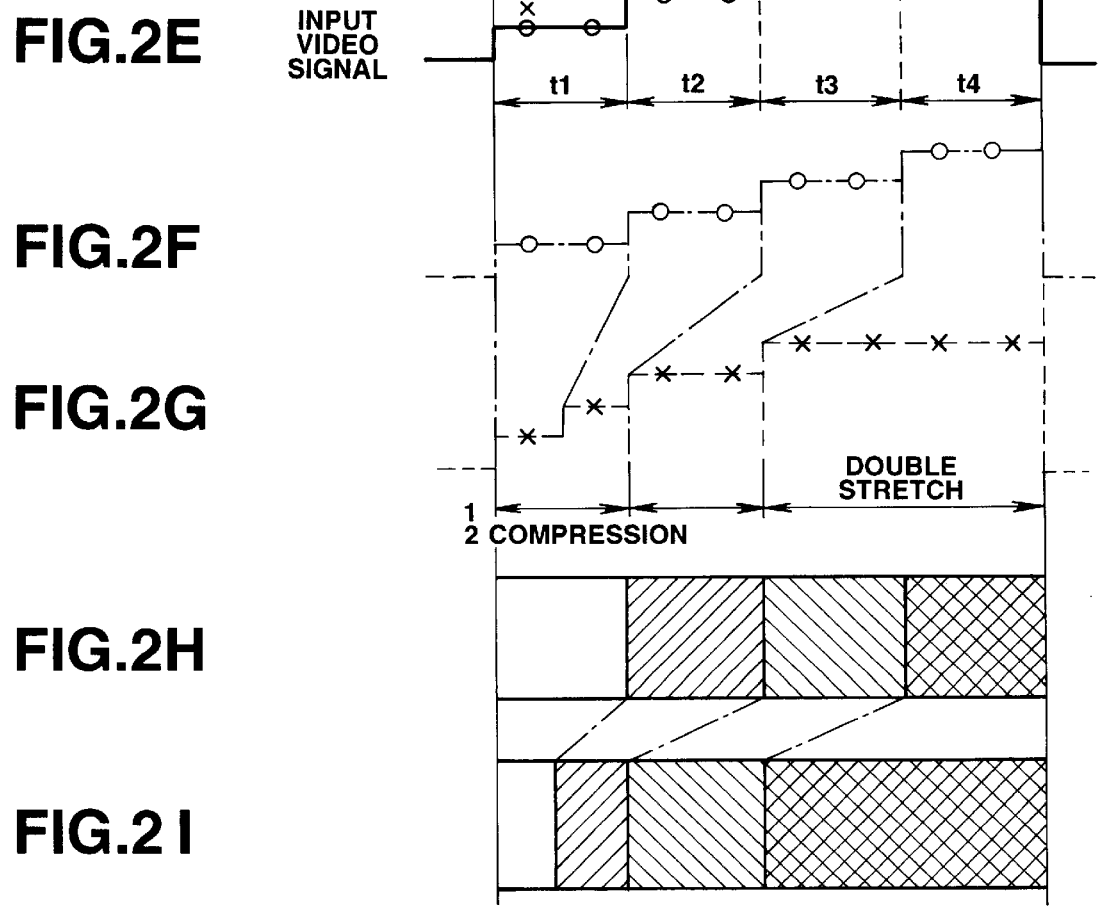
FIGS. 2A to 2I are explanatory diagrams for describing the operations of the liquid-crystal display shown in FIG. 1.

In FIG. 3, when the liquid-crystal panel 25 has an aspect ratio of 16:9 and an input video signal indicates an aspect ratio of 4:3 (for example, an NTSC broadcast signal), a picture contracting lengthwise as that shown in FIG. 2 ensues. In this embodiment, the selection by the switch 52 enables suppression of the lengthwise contraction phenomenon. Specifically, part of a picture to be displayed on the liquid-crystal panel 25 appearing in the center in the vertical direction of a screen is stretched in the vertical direction, and the remaining part thereof is compressed stepwise toward the upper and lower edges of the screen. Consequently, the roundness in the center in the vertical direction of a screen improves, and a picture not giving a sense of incompatibility ensues. The switch 52 is therefore switched over to the 1/mb frequency divider 31mb, 1/ma frequency divider 31ma, etc., and 1/mB frequency divider 31mB in the order during a first half of one vertical scanning period, and switched over to the 1/mB frequency divider 31mB, 1/mA frequency divider 31mA, etc., and 1/mb frequency divider 31mb in that order during a second half thereof. Parts of a picture appearing at the upper and lower edges of a screen are contracted a bit.

However, since more emphasis tends to be put on part of the picture appearing in the center of the television screen, the contractions of the picture at the upper and lower edges thereof are rather indiscernible.

Thus, compression or stretch can be performed arbitrarily in the vertical direction according to an input video signal. Similarly to the embodiment shown in FIG. 1, the number of clock pulses generated within one vertical scanning period is not necessarily agreed with the number of scan lines in a liquid-crystal panel.

Figure 4:
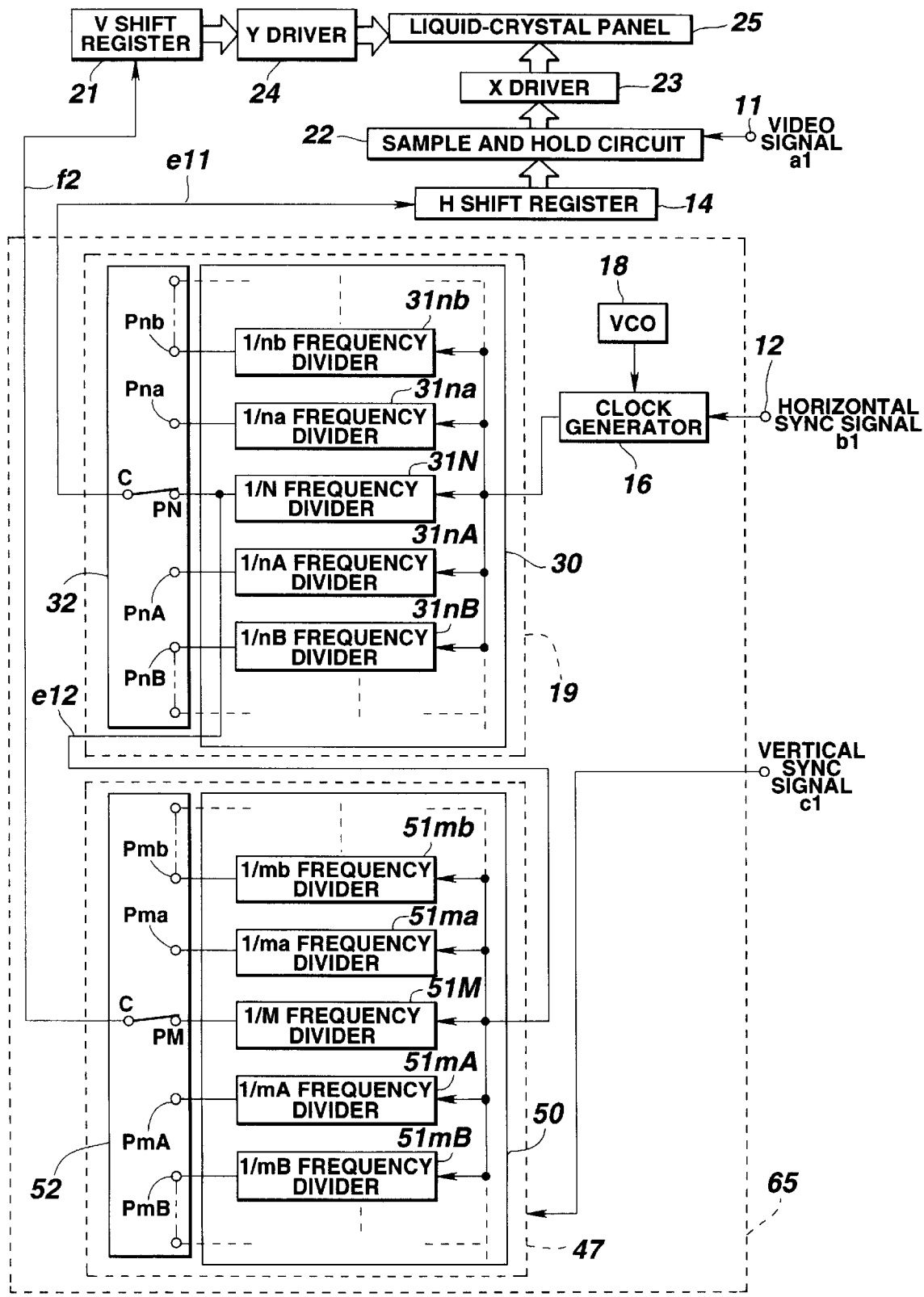
FIG. 4 is a block diagram showing the third embodiment of a liquid-crystal display in accordance with the present invention.
Figure 5:
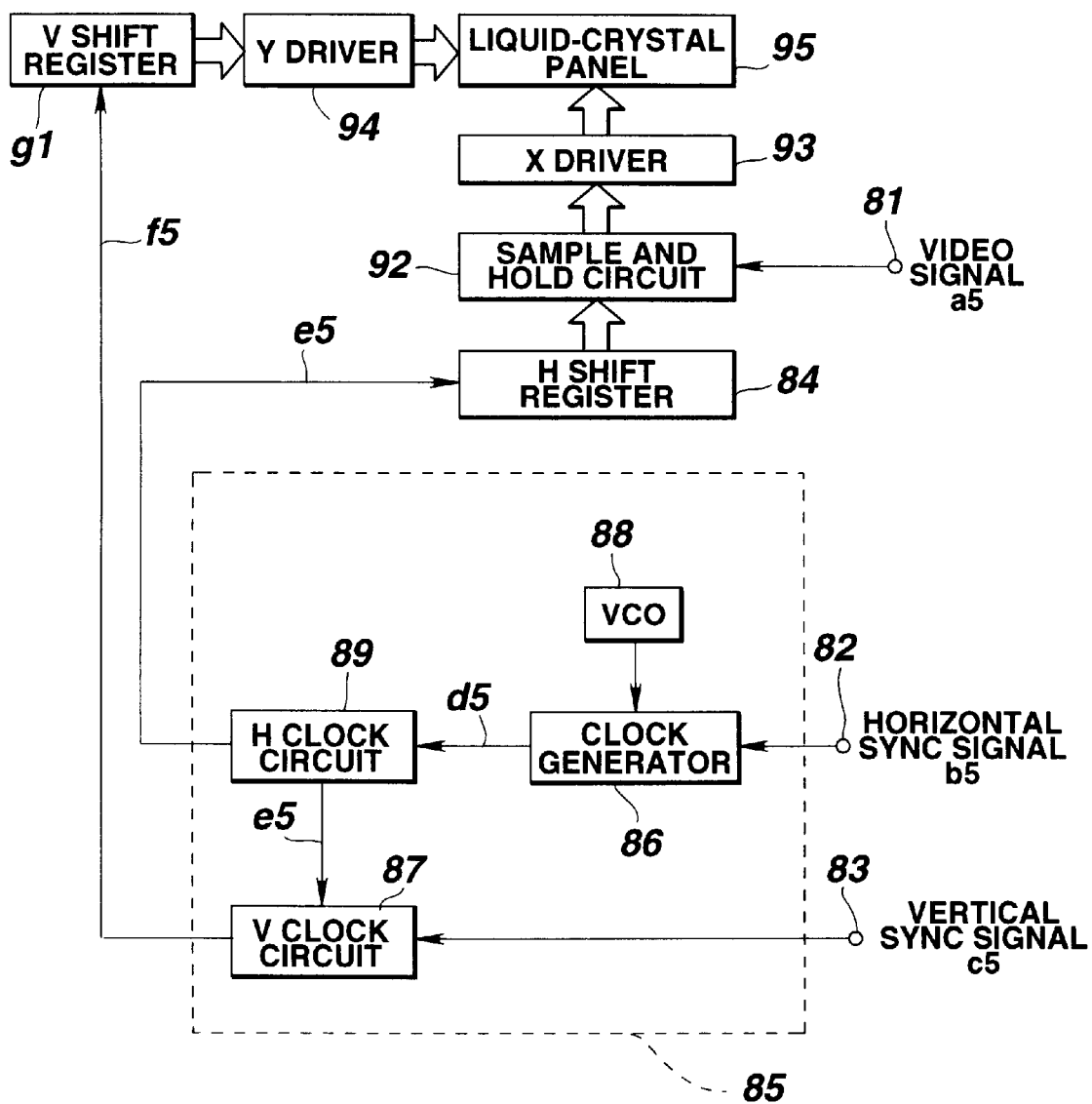
FIG. 5 is a block diagram showing a related art of a liquid-crystal display.

FIG. 4 shows the third embodiment of the present invention. In FIG. 4, components identical to those in FIGS. 1 and 3 are assigned the same reference numerals. The description of the components will be omitted.

The embodiment shown in FIG. 4 enables compression or stretch in both the horizontal and vertical directions of a screen, and differs from the embodiments shown in FIGS. 1 and 3 in a point that a clock oscillatory circuit 65 is adopted instead of the clock oscillatory circuit 15 or 45. The clock oscillatory circuit 65 comprises a VCO 18, clock generator 16, H clock circuit 19, and V clock circuit 47.

A switch 32 in the H clock circuit 19 outputs a clock e11 whose clock frequency varies within one horizontal scanning period. A switch 52 in the V clock circuit 47 outputs a clock f2 whose clock frequency varies within one vertical scanning period. These clocks e11 and f2 are supplied to an H shift register 14 and V shift register 21 respectively.

Next, the operations of the embodiment having the foregoing components will be described.

Figure 6:
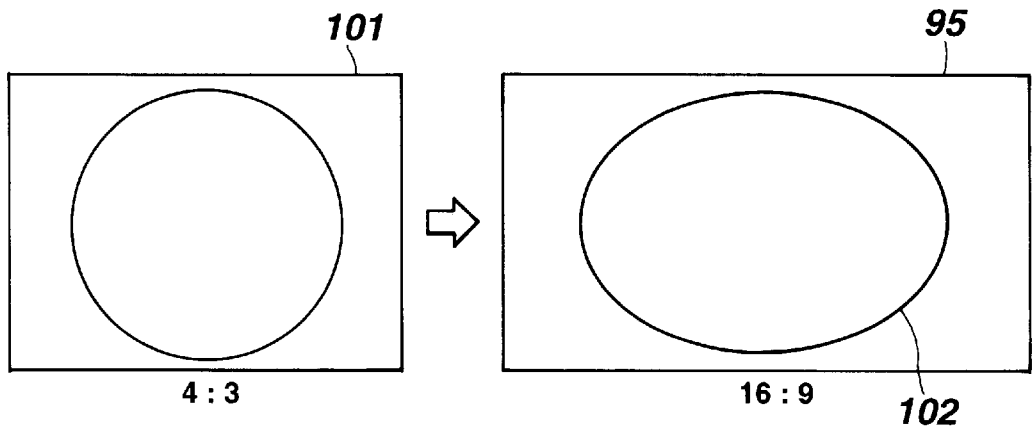
FIG. 6 is an explanatory diagram showing the first method of displaying a picture having an aspect ratio of 4:3 on a liquid-crystal panel whose screen has an aspect ratio of 16:9.
Figure 7:
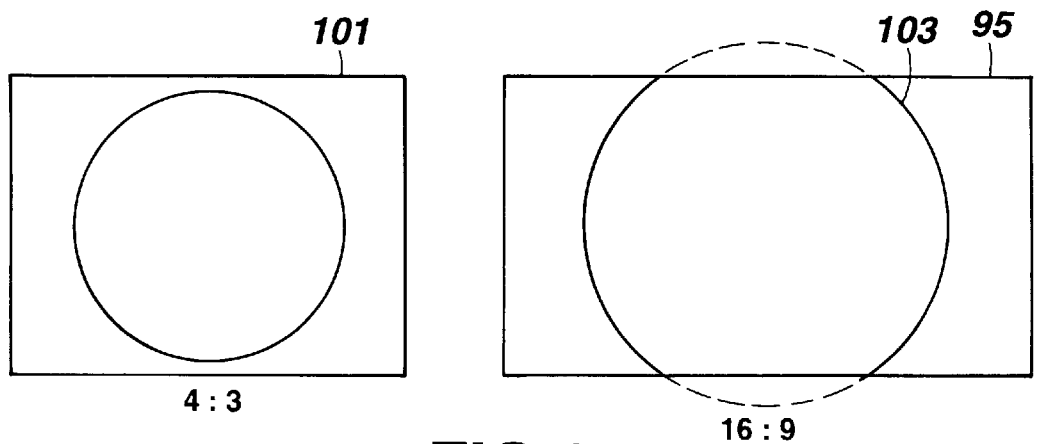
FIG. 7 is an explanatory diagram showing the second method of displaying a picture having an aspect ratio of 4:3 on a liquid-crystal panel whose screen has an aspect ratio of 16:9.

Assuming that a liquid-crystal panel 25 has an aspect ratio of 16:9 and an input video signal (for example an NTSC broadcast signal) indicates an aspect ratio of 4:3, if the horizontal or vertical reference clock alone is used, as shown in FIG. 6, a picture stretching sideways or contracting lengthwise as shown in FIG. 6 ensues. In this embodiment, the selection by the switches 32 and 52 enables suppression of the sideways stretch (lengthwise contraction) phenomenon.

Specifically, part of a picture to be displayed on a liquid-crystal panel 25 appearing in the center of a screen is compressed in the horizontal direction and stretched in the vertical direction. Parts of the picture appearing at the right-hand and left-hand edges of the screen are stretched in the horizontal direction, and parts thereof appearing at the upper and lower edges thereof are compressed in the vertical direction. Consequently, the roundness in the center of a screen improves, and a picture not give a sense of incompatibility ensues.

Thus, compression and stretch can be performed arbitrarily in the horizontal and vertical directions according to an input video signal. A picture not giving a sense of incompatibility can be displayed.

In the aforesaid embodiments, a general liquid-crystal display has been described. The present invention can apply to a projection type liquid-crystal display.

In the present invention, it will be apparent that a wide range of different embodiments can be formed on the basis of the present invention without a depart from the spirit and scope of the invention. The present invention will be limited to the appended claims but not restricted to any specific embodiments.

What is claimed is:

1. A liquid-crystal display, comprising:
    a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines;
    clock generating means including first means for producing a first clock synchronous with a horizontal sync signal conveyed with an input video signal from an input video signal source, and second means for producing a second clock synchronous with a vertical sync signal conveyed with said input video signal wherein at least one of said first means and said second means gradually varies stepwise the frequency of its clock within one horizontal or vertical scanning period, respectively;
    scanning means for producing a scan signal to be applied to said scan lines in said liquid-crystal panel using said second clock, and scanning said liquid-crystal panel with the produced scan signal; and
    picture data supplying means for sampling and holding said input video signal using said first clock, and applying the sampled and held signal as picture data to said data lines.

2. A liquid-crystal display, comprising:
    a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines:
    clock generating means including first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively; said clock generating means further including:
        a clock generation circuit for generating a clock having a frequency that is a given times as large as a horizontal frequency and being synchronous with said horizontal sync signal;
        frequency division means having a plurality of frequency dividers to which a clock sent from said clock generation circuit is input and which obtain different fractions of the frequency of the clock;
        switch means for providing said first clock by changing and selectively outputting the outputs of said plurality of frequency dividers; and
        control means for controlling the switching of said switch means within one horizontal scanning period synchronously with said horizontal sync signal;
    scanning means for producing a scan signal to be applied to said scan lines in said liquid-crystal panel using said second clock, and scanning said liquid-crystal panel with the produced scan signal; and
    picture data supplying means for sampling and holding said input video signal using said first clock, and applying the sampled and held signal as picture data to said data lines.

3. A liquid-crystal display according to claim 2, wherein said frequency division means includes:
    a reference frequency divider for generating a horizontal reference clock having the same number of clock pulses within one horizontal scanning period as the number of data lines in said liquid-crystal panel by obtaining a fraction of the frequency of a clock sent from said clock generation circuit;

at least one frequency divider responsible for a fraction smaller than the fraction set in said reference frequency divider; and at least one frequency divider responsible for a fraction larger than the fraction set in said reference frequency divider.

4. A liquid-crystal display according to claim 3, wherein said control means sets the number of clock pulses of said first clock sent from said switch means within one horizontal scanning period to a value equal to that of the number of data lines in said liquid-crystal panel.

5. A liquid-crystal display according to claim 2, wherein said control means varies the frequency of said first clock between the center of a screen and the edges of the screen.

6. A liquid-crystal display, comprising:

a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines;

clock generating means including first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively; said clock generating means further including:

a clock generation circuit for generating a clock having a frequency that is a given times as large as a horizontal frequency and being synchronous with said horizontal sync signal;

frequency division means having a plurality of frequency dividers to which a clock sent from said clock generation circuit is input and which obtain different fractions of the frequency of said clock;

switch means for providing said first clock by changing and selectively outputting the outputs of said plurality of frequency dividers;

control means for controlling the switching of said switch means within one horizontal scanning period synchronously with said horizontal sync signal; and a vertical clock generation circuit for obtaining a fraction of the frequency of the output of a specific frequency divider among said plurality of frequency dividers, and providing said second clock synchronously with said vertical sync signal;

scanning means for producing a scan signal to be applied to said scan lines in said liquid-crystal panel using said second clock, and scanning said liquid-crystal panel with the produced scan signal; and picture data supplying means for sampling and holding said input video signal using said first clock, and applying the sampled and held signal as picture data to said data lines.

7. A liquid-crystal display, comprising:

a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines;

clock generating means including first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively; said clock generating means further including:

a clock generation circuit for generating a clock having a frequency that is a given times as large as a vertical frequency and being synchronous with said vertical sync signal;

frequency division means having a plurality of frequency dividers to which a clock sent from said clock generation circuit is input and which obtain different fractions of the frequency of the clock;

switch means for providing said second clock by changing and selectively outputting the outputs of said plurality of frequency dividers; and control means for controlling the switching of said switch means within one vertical scanning period synchronously with said vertical sync signal;

scanning means for producing a scan signal to be applied to said scan lines in said liquid-crystal panel using said second clock, and scanning said liquid-crystal panel with the produced scan signal; and picture data supplying means for sampling and holding said input video signal using said first clock, and applying the sampled and held signal as picture data to said data lines.

8. A liquid-crystal display according to claim 7, wherein said frequency division means includes:

a reference frequency divider for generating a vertical reference clock having the same number of clock pulses within one vertical scanning period as the number of scan lines in said liquid-crystal panel by obtaining a fraction of the frequency of a clock sent from said clock generation circuit;

at least one frequency divider responsible for a smaller fraction than said reference frequency divider is; and at least one frequency divider responsible for a larger fraction than said reference frequency divider is.

9. A liquid-crystal display according to claim 8, wherein said control means sets the number of clock pulses of said second clock sent from said switch means within one vertical scanning period to a value equal to that of the number of scan lines in said liquid-crystal panel.

10. A liquid-crystal display, comprising:

a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines;

clock generating means including first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively; said clock generating means further comprising:

a clock generation circuit for generating a clock having a frequency that is a given times as large as a horizontal frequency and being synchronous with said horizontal sync signal;

a first frequency division circuit to which a clock sent from said clock generation circuit is input, and which obtains a given fraction of the frequency of the clock and outputs a resultant voltage as a first clock;

frequency division means having a plurality of frequency dividers to which said first clock sent from said first frequency division circuit is input and which obtain different fractions of the frequency of said first clock;

switch means for providing said second clock by changing and selectively outputting the outputs of said plurality of frequency dividers; and control means for controlling the switching of said switch means within one vertical scanning period synchronously with said vertical sync signal;

scanning means for producing a scan signal to be applied to said scan lines in said liquid-crystal panel using said second clock, and scanning said liquid-crystal panel with the produced scan signal; and picture data supplying means for sampling and holding said input video signal using said first clock, and applying the sampled and held signal as picture data to said data lines.

11. A liquid-crystal display, comprising:

a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines:

clock generating means including first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively; said clock generating means further including:

clock generation circuit for generating a clock having a frequency that is a given times as large as a horizontal frequency and being synchronous with said horizontal sync signal;

first frequency division means having a plurality of frequency dividers to which a clock sent from said clock generation circuit is input and which obtain different fractions of the frequency of the clock;

first switch means for providing said first clock by changing and selectively outputting the outputs of said plurality of frequency dividers of said first frequency division means;

first control means for controlling the switching of said first switch means within one horizontal scanning period synchronously with said horizontal sync signal;

second frequency division means having a plurality of frequency dividers to which a clock sent from a specific frequency divider among said plurality of frequency dividers of said first frequency division means is input and which obtain different fractions of the frequency of the clock;

second switch means for providing said second clock by changing and selectively outputting the outputs of said plurality of frequency dividers of said second frequency division means; and second control means for controlling the switching of said second switch means within one vertical scanning period synchronously with said vertical sync signal;

scanning means for producing a scan signal to be applied to said scan lines in said liquid-crystal panel using said second clock, and scanning said liquid-crystal panel with the produced scan signal; and picture data supplying means for sampling and holding said input video signal using said first clock, and applying the sampled and held signal as picture data to said data lines.

12. A liquid-crystal display, comprising:

a liquid-crystal panel including a plurality of liquid-crystal pixels formed like a matrix with a plurality of data lines arranged in the vertical direction and a plurality of scan lines arranged in the horizontal direction, and having said liquid-crystal pixels driven with picture data applied to said data lines and a scan signal applied to said scan lines;

clock generating means having first means for producing a first clock synchronous with a horizontal sync signal conveyed with an input video signal, and second means for producing a second clock synchronous with a vertical sync signal conveyed with said input video signal wherein at least one of said first means and said second means gradually varies stepwise the frequency of its clock within one horizontal or vertical scanning period, respectively;

scanning means for producing a scan signal to be applied to said scan lines in said liquid-crystal panel using said second clock, and scanning said liquid-crystal panel with the produced scan signal;

picture data supplying means for sampling and holding said input video signal using said first clock, and applying the sampled and held signal as picture data to said data lines in said liquid-crystal panel; and control means for controlling said clock generating means so that when a picture based on a video signal indicating the same aspect ratio as the aspect ratio of said liquid-crystal panel is to be displayed on said liquid-crystal panel, first and second clocks having constant frequencies can be produced, and so that when a video signal indicating an aspect ratio different from the aspect ratio of said liquid-crystal panel is to be displayed on said liquid crystal panel, at least one of the frequencies of said first and second clocks can be varied periodically such that a compression ratio is varied gradually from an end to a center of said liquid-crystal panel when the video signal is displayed on the liquid crystal panel.

* * * * *